United States Patent [19]

Stapp

[11] Patent Number: 5,186,510
[45] Date of Patent: Feb. 16, 1993

[54] FOLDABLE PICKUP TRUCK TOOL BOX

[76] Inventor: Carroll E. Stapp, 2170 Golden Arrow, Las Vegas, Nev. 89109

[21] Appl. No.: 829,700

[22] Filed: Jan. 31, 1992

[51] Int. Cl.$^5$ .............................................. B60R 9/00
[52] U.S. Cl. ................................ 296/37.5; 190/107; 190/110; 224/42.42; 224/273; 296/37.6
[58] Field of Search .............. 296/37.1, 37.5, 37.6; 224/42.42, 273; D12/157; 190/107, 110; 280/769; 312/277, DIG. 33

[56] References Cited

U.S. PATENT DOCUMENTS

| | | | |
|---|---|---|---|
| D. 275,275 | 8/1984 | Stapp | D12/157 |
| 949,204 | 2/1910 | Stiehl | 296/37.5 X |
| 4,085,961 | 4/1978 | Brown | 296/37.6 |
| 4,522,326 | 6/1985 | Tuohy, III | 224/310 |
| 4,635,992 | 1/1987 | Hamilton et al. | 296/37.6 |
| 4,705,315 | 11/1987 | Cherry | 296/37.1 |
| 4,750,773 | 6/1988 | Chapline et al. | 296/37.5 X |
| 4,752,095 | 6/1988 | Brady | 296/37.6 |
| 4,850,519 | 7/1989 | Farmer, Jr. | 296/37.6 X |

FOREIGN PATENT DOCUMENTS 2478447  9/1981  France ........................... 190/107

Primary Examiner—Charles A. Marmor
Assistant Examiner—Andrew C. Pike
Attorney, Agent, or Firm—James E. Bradley

[57] ABSTRACT

A tool box for a pickup bed has separate upper and lower compartments. The lower compartment collapses into a flat configuration for storage in the upper compartment during shipping. The tool box has wheels on its bottom for rolling on the bed of the pickup. The spacing between the wheels can be adjusted so as to locate the wheels for alignment with grooves formed in the pickup bed floor.

13 Claims, 3 Drawing Sheets

FOLDABLE PICKUP TRUCK TOOL BOX

BACKGROUND OF THE INVENTION

1. Field of the invention

This invention relates in general to storage compartments, and in particular to a storage compartment for location in a bed of a pickup.

2. Description of the Prior Art

Pickup tool boxes for location in the bed of a pickup are currently marketed. Generally these boxes have a lower portion that extends between side panels of the bed and an upper portion that may locate on the upper edges of the side panels of the bed. The top is hinged to provide access to the interior of the compartment. While these types of tool boxes work well enough, they are large and bulky to ship. They do not conveniently collapse to a lesser dimension for shipping.

Another disadvantage is that to access the tools in a central portion of the tool box, the user may have to climb into the bed of the truck. The user may not be able to easily reach over the side panels of the bed into portions of the tool box because of the height and width of the bed. Tool boxes have been proposed in the patented art that have wheels that allow the tool box to be rolled back to the tailgate area of the pickup bed. Access to the tool box is much more convenient at the tailgate. However, the patented proposals require special guide tracks to be installed in the bed to guide the wheels. The guide tracks can be expensive and time consuming to install properly. They can be damaged while hauling materials in the bed.

SUMMARY OF THE INVENTION

In this invention, the tool box is divided into upper and lower compartments. These compartments are separate, each having a separate door. The lower compartment has a smaller bottom panel than the bottom panel of the upper compartment. The sidewalls, door, and bottom of the lower compartment readily release from each other and fold to a position in which they are stacked, parallel with each other. The folded lower compartment will fit within the upper compartment for shipping.

The tool box has wheels that allow the tool box to be rolled to the rear of the vehicle if desired. The wheels locate on the bottom of the tool box and roll on conventional grooves in the floor of the pickup. The wheel brackets can be adjusted to various widths so as to position the wheels in the grooves of the pickup bed.

DETAILED DESCRIPTION OF THE INVENTION

Figure 1:
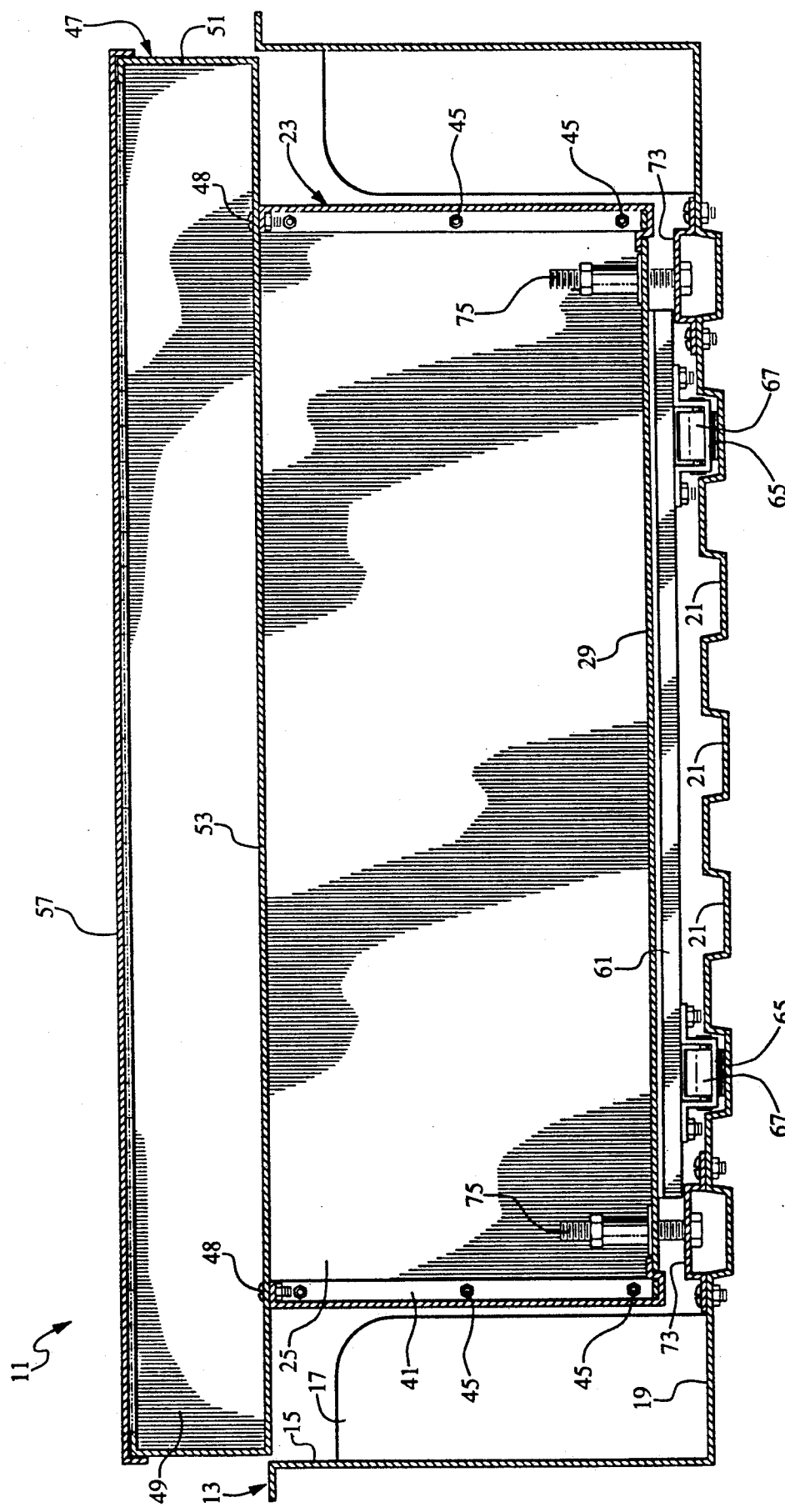
FIG. 1 is a sectional view illustrating a tool box constructed in accordance with this invention and shown installed in a bed of a pickup, the section being taken along a vertical plane passing perpendicular to a longitudinal axis of the pickup, as indicated by the line 1—1 of FIG. 4.

Referring to FIG. 1, tool box 11 is dimensioned to fit within a pickup bed 13. Pickup bed 13 will have side panels 15. In some types, wheel wells 17 will locate on the interior of the side panels 15 of pickup bed 13. In other types, wheel wells 17 will locate on the exterior of side panels 15. Pickup bed 13 has a base or floor 19. Floor 19 has a plurality of parallel, longitudinally extending grooves 21

Tool box 11 has a lower compartment 23 which locates between side panels 15. Lower compartment 23 will be dimensioned to fit closely between wheel wells 17 in the case of interior wheel wells 17, or between side panels 15 in the case of exterior wheel wells 17. Lower compartment 23 is rectangular, having a back wall 25, two side walls 27, and a bottom 29.

Figure 4:
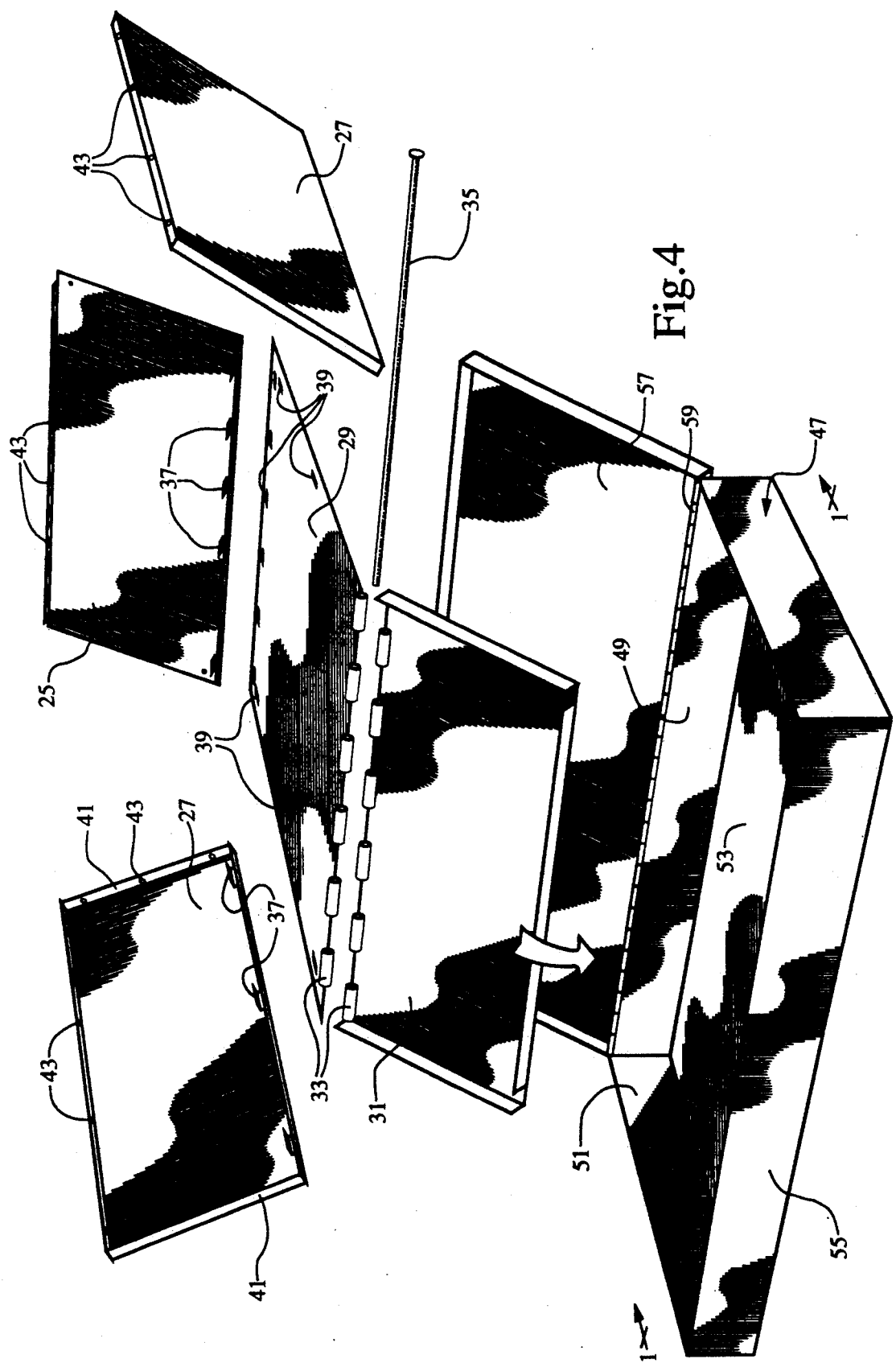
FIG. 4 is an exploded perspective view of the tool box of FIG. 1, showing the lower compartment being folded to a storage position for placement in the upper compartment.

Referring to FIG. 4, the front wall of lower compartment 23 comprises a door 31. Door 31 has the same dimensions as back wall 25. Door 31 secures to lower compartment 23 by a hinge 33 located on its lower edge and on the forward edge of bottom 29. A hinge pin 35 will releasably secure the mating portions of hinge 33. Door 31 will open by swinging downward, rotating about hinge 33. Hinge pin 35 can be removed to detach door 31 from bottom 29.

The back wall 25 and side walls 27 releasably connect to the bottom 29 and to each other. Part of the connection means comprises a plurality of lugs 37 which depend from the lower edges of the side walls 27 and back wall 25. Lugs 37 locate within slots 39 in the bottom 29. Slots 39 are located around the marginal edge of bottom 29.

The side walls 27 have edge strips 41 on the upper, lower, and side edges. Each edge strip 41 is bent at a 90 degree angle relative to each side wall 27. Screw holes 43 extend through the two vertical edge strips 41 located at the rear edges of side panels walls 27. Screws 45 (FIG. 1) will interconnect the side walls 27 with the back wall 25.

An upper compartment 47 mounts to the lower compartment 23, as illustrated in FIG. 1, by screws 48 extending into an upper edge strip on each lower compartment side wall 27. Upper compartment 47 has a back wall 49, two side walls 51, a bottom 53, a front wall 55, and a top 57. Screws 48 extend through holes in the bottom 53. Top 57 of upper compartment 47 is connected to upper compartment 47 by a hinge 59 as illustrated in FIG. 4. Hinge 59 allows top 57 to swing upward for access to the interior of upper compartment 47.

Upper compartment 47 is rectangular and has a lesser height than the lower compartment 23. The bottom 53 of upper compartment 47 has a greater width and length than the bottom 29 of lower compartment 23. The dimensions of the lower compartment back wall 25 and side walls 27 are also smaller than the dimensions of the bottom 53 of upper compartment 47. This allows the lower compartment back wall 25, side walls 27, bottom 29, and door 31 to be stacked one on another in a parallel position and within the upper compartment 47.

Lower compartment bottom 23 includes a pair of bottom channels 61 (only one shown) extending across the bottom 53 in a lateral direction perpendicular to the longitudinally extending pickup bed grooves 21. Channels 61 are parallel to each other and secured by screws to bottom 53. Each channel 61 has two elongated slots 63, shown in FIGS. 2 and 3 (only one shown). Slots 63 are spaced laterally apart from each other.

A pair of wheel brackets 65 secure to the slots 63 in the two bottom channels 61. Wheel brackets 65 are laterally spaced apart from each other and perpendicular to channels 61. Each wheel bracket 65 extends longitudinally from a point near the door 31 (FIG. 4) to the back wall 25. Each wheel bracket 65 extends parallel with the longitudinal bed grooves 21 once the tool box 11 is installed in pickup bed 13.

A pair of wheels 67 (only one shown) are rotatably mounted in each wheel bracket 65. One wheel 67 will be near the door 31 (FIG. 4) and one near the back wall 25. Each wheel bracket 65 has external flanges 69. Fasteners, such as bolts 71, extend through the flanges 69 and through the slots 63. The elongated slots 63 and bolts 71 enable the wheel brackets 65 to be adjusted closer toward each other or farther apart from each other This adjustment allows the wheels 67 to be positioned so that each will locate within one of the grooves 21 of the pickup bed floor 19.

The tool box 11 can be locked into a position to prevent the wheels 67 from rolling on the bed floor 19. This may be handled by securing a pair of lock channels 73 to the bed floor 19. Lock channels 73 are short rectangular members that extend parallel with grooves 21 a short distance. Lock channels 73 are spaced apart from each other, one near each side wall 27, for locking the tool box 11 at two laterally spaced apart points.

Figure 3:
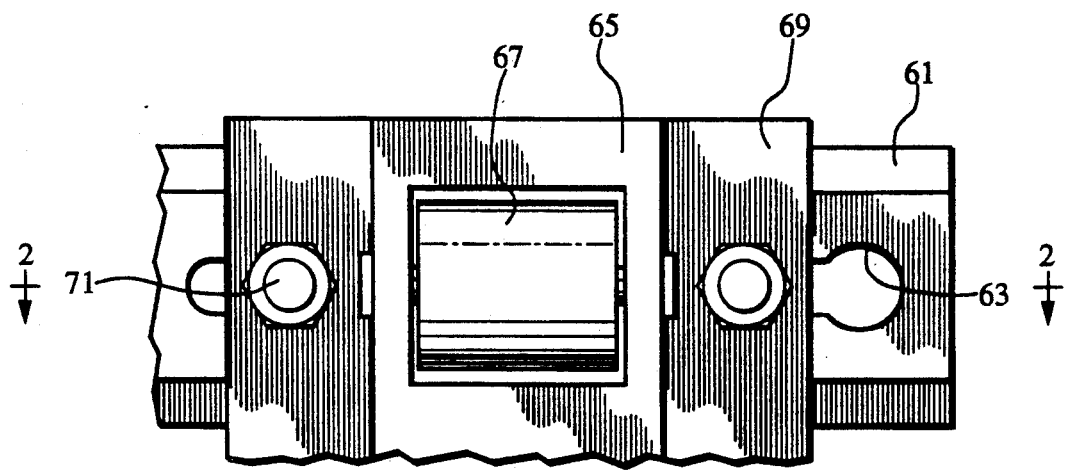
FIG. 3 is a bottom view of the wheel and wheel bracket shown in FIG. 2.

Each lock channel 73 has a longitudinally extending slot (not shown), which has an enlarged portion at one end, similar to the enlarged portion of slot 63 shown in FIG. 3. A bolt 75 will extend through an aperture in the bottom 29 for engaging the slot in the lock channel 73. The head of the bolt will pass through the enlarged end of the slot, but will be retained in the remaining portion of the slot. The slot in the lock channel 73 will allow the bolt 75 to be withdrawn from the lock channel 73 by loosening and repositioning. It will not be necessary to entirely remove the bolt 75 in order to allow the tool box 11 to be moved.

After manufacturing the tool box 11, the manufacturer will position the back wall 25, side walls 27, bottom 29, and door 31 within the upper compartment 47. The back wall 25, side walls 27, bottom 29, and door 31 will be stacked on each other and parallel with the bottom 53 of upper compartment 47.

The user will assemble the tool box 11 by first securing the back wall 25 and side walls 27 to the bottom 29 by inserting the lugs 37 in the slots 39. The user will attach screws 45 (FIG. 1) in the screw holes 43 (FIG. 4). The user inserts the hinge pin 35 through the hinge portions 33. The user then secures the fasteners 48 through the bottom 53 into the upper edge strips 41 of the lower compartment side walls 27. This secures the lower compartment 23 to the upper compartment 47.

Figure 2:
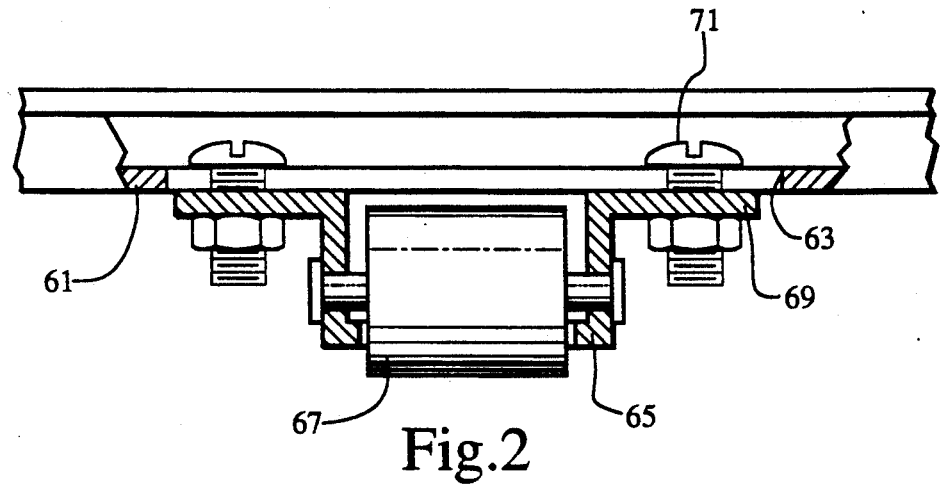
FIG. 2 is an enlarged sectional view of one of the wheel brackets and wheels for the tool box of FIG. 1, taken along line 2—2 of FIG. 3.

The user adjusts the distance between the wheels 67 by adjusting bolts 71 (FIG. 2). The adjustment is selected to be the same distance as between two of the floor grooves 21. The user installs lock channels 73 in a desired position at the forward end of the bed floor 19. Once the tool box 11 is positioned at the forward end of bed 13, the user will secure bolts 75 in mating slots in the lock channels 73. To roll the tool box 11 to the tail gate (not shown), the user loosens bolts 75 and removes the heads of the bolts 75 from the lock channels 73. The tool box 11 is then free to roll on wheels 67 to the rear of the pickup bed 13.

The invention has significant advantages. The tool box is readily collapsible for shipping. The tool box has convenient access through its top door and bottom compartment door. Separating the tool box into two separate compartments improves organization for storage of tools and the like. Providing wheels to roll on the grooves of the truck bed avoids the need for having special wheel tracks installed.

While the invention has been shown in only one of its forms, it should be apparent to those skilled in the art that it is not so limited, but is susceptible to various changes without departing from the scope of the invention.

I claim;

1. A tool box for a pickup bed, the bed being of a type having a floor and side panels, the tool box comprising in combination:
    a rectangular lower compartment dimensioned to fit within the side panels of the bed, the lower compartment having a lower compartment back wall, two lower compartment side walls, a lower compartment bottom, and a front door which opens and closes to provide access to an interior of the lower compartment;
    a rectangular upper compartment having an upper compartment bottom, an upper compartment back wall, two upper compartment side walls, an upper compartment front wall, and a top, the upper compartment having a greater dimension from one upper compartment side wall to the other upper compartment side wall than a dimension from one lower compartment side wall to the other lower compartment side wall;
    fastening means for fastening the upper compartment to the lower compartment;
    top hinge means for opening and closing the top of the upper compartment to provide access to an interior of the upper compartment; and folding means interconnecting the walls, the bottom, and the door of the lower compartment for folding the walls, the bottom, and the door of the lower compartment from a collapsed position parallel with each other and stacked on one another for storage in the upper compartment to an erect rectangular position.

2. The tool box according to claim 1 wherein a height of the walls of the upper compartment is less than a height of the walls of the lower compartment.

3. The tool box according to claim 1 wherien the upper compartment has a greater dimension from the back wall thereof to the front wall thereof than a dimension from the back wall to the door of the lower compartment.

4. The tool box according to claim wherein the folding means includes a hinge between the door and the lower compartment bottom of the lower compartment, the hinge also functioning to allow the door to be opened and closed.

5. The tool box according to claim wherein the folding means comprises:
    a plurality of mating lugs and slots formed along a lower edge of the lower compartment back wall and a rear edge of the lower compartment bottom for releasably securing the lower compartment back wall to the lower compartment bottom;
    a plurality of mating lugs and slots formed along a lower edge of each of the lower compartment side walls and opposite side edges of the lower compartment bottom for releasably securing the lower compartment side walls to the lower compartment bottom; and a hinge interconnecting the lower compartment bottom and the door.

6. The tool box according to claim 1 further comprising a plurality of wheels secured to a lower side of the lower compartment bottom for rolling on the floor of the bed.

7. The tool box according to claim 1 further comprising:
   a pair of spaced-apart brackets;
   at least one wheel rotatably mounted to each of the brackets; and
   means for securing the brackets to a lower side of the lower compartment bottom at selected adjustable distances apart from each other for positioning the wheel at desired positions for rolling on the floor of the bed of a pickup.

8. The tool box according to claim 1 further comprising:
   a pair of spaced-apart brackets;
   at least one wheel rotatably mounted to each of the brackets; and
   a plurality of elongated slots at the lower compartment bottom; and
   a plurality of fasteners extending through the slots for securing the brackets to a lowe side of the lower compartment bottom, the elongation of the slots allowing the brackets to be positioned at selected distances apart from each other for placing the wheel at desired locations for rolling on the floor of the bed of a pickup.

9. A tool box for a pickup bed, the bed having a floor and side panels, the box comprising in combination:
   a rectangular lower compartment dimensioned to fit within the side panels of the bed, the lower compartment having a lower compartment back wall, two lower compartment side walls, a lower compartment bottom, and a front door;
   a rectangular upper compartment having an upper compartment bottom, an upper compartment back wall, two upper compartment side walls, an upper compartment front wall, and a top, the upper compartment bottom having greater width and length than the lower compartment bottom, the upper compartment side walls having a lesser height than the lower compartment side walls;
   a plurality of fastener means extending through the upper compartment bottom into the lower compartment to releasably secure the upper compartment to the lower compartment;
   a top hinge means connecting the top with the upper compartment back wall for allowing the top to swing upwardly to provide access to an interior of the upper compartment;
   a lower hinge means connecting the front door with a forward edge of the lower compartment bottom for allowing the front door to swing downwardly for access to an interior of the lower compartment, and for allowing the front door to be positioned parallel and stacked with the lower compartment bottom in the upper compartment for storage during shipping;
   a plurality of mating lugs and slot means formed along a lower edge of the lower compartment back wall and a rear edge of the lower compartment bottom for releasably securing the lower compartment back wall to the lower compartment bottom, and for allowing the lower compartment back wall to be positioned parallel with the lower compartment bottom in the upper compartment for storage during shipping; and
   a plurality of mating lugs and slot means formed along a lower edge of each of the lower compartment side walls and opposite side edges of the lower compartment bottom for releasably securing the lower compartment side walls to the lower compartment bottom, and for allowing the lower compartment side walls to be positioned parallel and stacked with the lower compartment bottom in the upper compartment for storage during shipping.

10. The tool box according to claim 9 wherein the lower hinge means allows the door to be released from the lower compartment bottom for positioning the door parallel with the lower compartment bottom in the upper storage compartment.

11. The tool box according to claim 9 further comprising a plurality of wheels secured to a lower side of the lower compartment bottom for rolling on the floor of the bed.

12. The tool box according to claim 9 further comprising:
   a pair of spaced-apart brackets;
   at least one wheel rotatably mounted to each of the brackets; and
   fastening means for securing the brackets to a lower side of the lower compartment bottom at selected distances apart from each other for positioning the wheel at desired positions for rolling on the floor of the bed of a pickup.

13. The tool box according to claim 9 further comprising:
   a pair of spaced-apart brackets;
   at least one wheel rotatably mounted to each of the brackets;
   a plurality of elongated slots at the lower compartment bottom; and
   a plurality of fasteners extending through the slots for securing the brackets to a lower side of the lower compartment bottom, the elongation of the slots allowing the brackets to be positioned at selected distances apart from each other for placing the wheel at desired locations for rolling on the floor of the bed of a pickup.

* * * * *